US012473877B2

(12) United States Patent
Eismark et al.

(10) Patent No.: US 12,473,877 B2
(45) Date of Patent: Nov. 18, 2025

(54) FUEL INJECTION ARRANGEMENT AND A HYDROGEN INTERNAL COMBUSTION ENGINE

(71) Applicant: VOLVO TRUCK CORPORATION, Gothenburg (SE)

(72) Inventors: Jan Eismark, Gothenburg (SE); Rickard Ehleskog, Hisings Backa (SE); Gustavo Hindi, Surte (SE); Tommy Simonsson, Stenungsund (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/720,133

(22) PCT Filed: Dec. 17, 2021

(86) PCT No.: PCT/EP2021/086568
§ 371 (c)(1),
(2) Date: Jun. 14, 2024

(87) PCT Pub. No.: WO2023/110133
PCT Pub. Date: Jun. 22, 2023

(65) Prior Publication Data
US 2025/0059937 A1 Feb. 20, 2025

(51) Int. Cl.
*F02M 21/02* (2006.01)
*F16K 1/54* (2006.01)

(52) U.S. Cl.
CPC ...... *F02M 21/026* (2013.01); *F02M 21/0206* (2013.01); *F16K 1/54* (2013.01)

(58) Field of Classification Search
CPC ............ F02M 21/026; F02M 21/0206; F02M 21/0269; F02M 61/06; F02M 61/08;
(Continued)

(56) References Cited

U.S. PATENT DOCUMENTS 1,673,511 A * 6/1928 Hosford ................. F02M 61/06
239/584
1,737,155 A * 11/1929 Hewitt ................... F02M 55/00
239/452
(Continued)

FOREIGN PATENT DOCUMENTS

DE 532013 C * 8/1931
DE 862975 C * 1/1953
(Continued)

OTHER PUBLICATIONS

International Search Report and Written Opinion of the International Searching Authority in corresponding International Application No. PCT/EP2021/086568 mailed Aug. 22, 2022 (12 pages).
(Continued)

*Primary Examiner* — Hung Q Nguyen
(74) *Attorney, Agent, or Firm* — Venable LLP; Jeffri A. Kaminski

(57) ABSTRACT

A fuel injection arrangement admits a flow of hydrogen into a combustion chamber of hydrogen internal combustion engine. The fuel injection arrangement has a nozzle cap and an inlet valve arrangement. An inner surface of the nozzle cap comprises a nozzle protrusion protruding radially towards an envelope surface of a flow guiding portion of the inlet valve arrangement. The nozzle protrusion is arranged axially between a valve protrusion of the inlet valve arrangement and an outlet of the nozzle cap. The valve protrusion and the nozzle protrusion at least partly overlap in a radial direction.

16 Claims, 5 Drawing Sheets

(58) Field of Classification Search
CPC .... F02M 61/188; F02M 61/1893; F16K 1/54; Y02T 10/30
See application file for complete search history.

(56) References Cited

U.S. PATENT DOCUMENTS

| | | | | |
|---|---|---|---|---|
| 2,172,556 A | * | 9/1939 | Edwards | F02M 61/08 239/452 |
| 2,439,832 A | * | 4/1948 | Voit | F02M 61/08 239/453 |
| 2,753,217 A | * | 7/1956 | Pecora, Jr. | F02M 61/168 239/590.5 |
| 3,156,414 A | * | 11/1964 | Dressler | F02M 61/14 239/455 |
| 4,408,722 A | * | 10/1983 | Frelund | F02M 61/06 239/453 |
| 5,551,638 A | | 9/1996 | Caley | |
| 5,836,521 A | * | 11/1998 | Holm | F02M 51/061 239/584 |
| 10,208,711 B2 | | 2/2019 | Moser et al. | |
| 10,260,450 B2 | | 4/2019 | Jacob | |
| 2004/0021015 A1 | | 2/2004 | Murdoch | |
| 2017/0321636 A1 | | 11/2017 | Moser et al. | |

FOREIGN PATENT DOCUMENTS

| | | | | |
|---|---|---|---|---|
| DE | 2825998 A1 | * | 1/1980 | |
| DE | 3201044 A1 | * | 7/1983 | |
| DE | 3734737 A1 | * | 4/1988 | |
| DE | 102004044820 A1 | | 3/2006 | |
| DE | 102014224344 A1 | * | 6/2016 | ......... F02M 21/0257 |
| DE | 102015225216 A1 | | 6/2017 | |
| DE | 102017219932 A1 | | 5/2019 | |
| EP | 0234642 A1 | | 9/1987 | |
| EP | 2707592 B1 | * | 4/2020 | ........... F02M 51/061 |
| GB | 2099505 A | * | 12/1982 | ............. F02M 61/06 |
| GB | 2219627 A | * | 12/1989 | ........... F02M 61/042 |
| JP | 2768740 B2 | * | 6/1998 | |
| WO | 9808014 A1 | | 2/1998 | |
| WO | WO-2004106728 A1 | * | 12/2004 | ............. F02M 61/08 |
| WO | WO-2014022640 A1 | * | 2/2014 | ............... B23H 1/00 |
| WO | 2018036966 A1 | | 3/2018 | |

OTHER PUBLICATIONS

Written Opinion of the International Preliminary Examining Authority (Second Written Opinion) in corresponding International Application No. PCT/EP2021/086568 mailed Sep. 28, 2023 (4 pages).
International Preliminary Report on Patentability in corresponding International Application No. PCT/EP2021/086568 mailed Mar. 18, 2024 (6 pages).
Non Final Office Action dated Jun. 2, 2025 in corresponding U.S. Appl. No. 18/720,177, 11 pages.

* cited by examiner

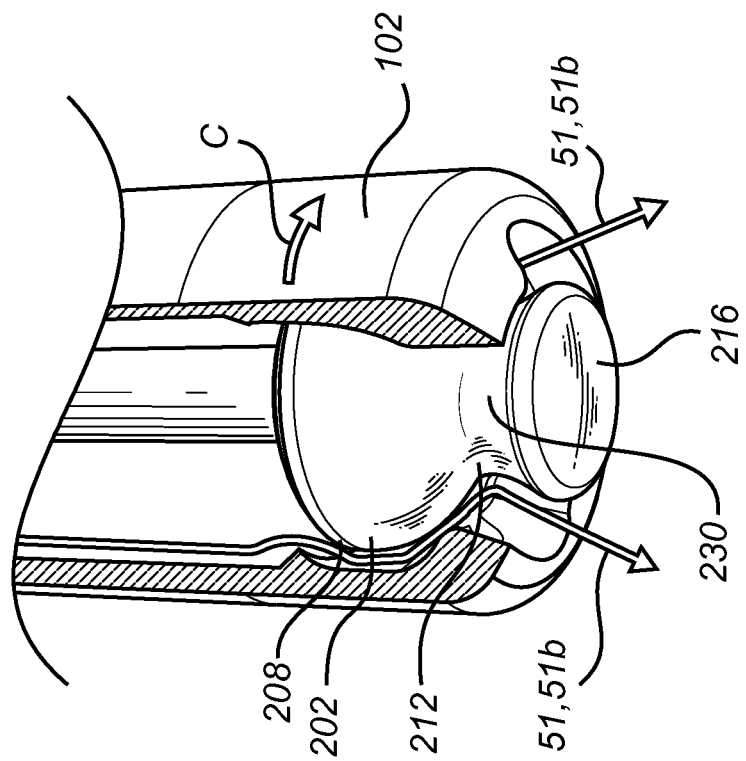
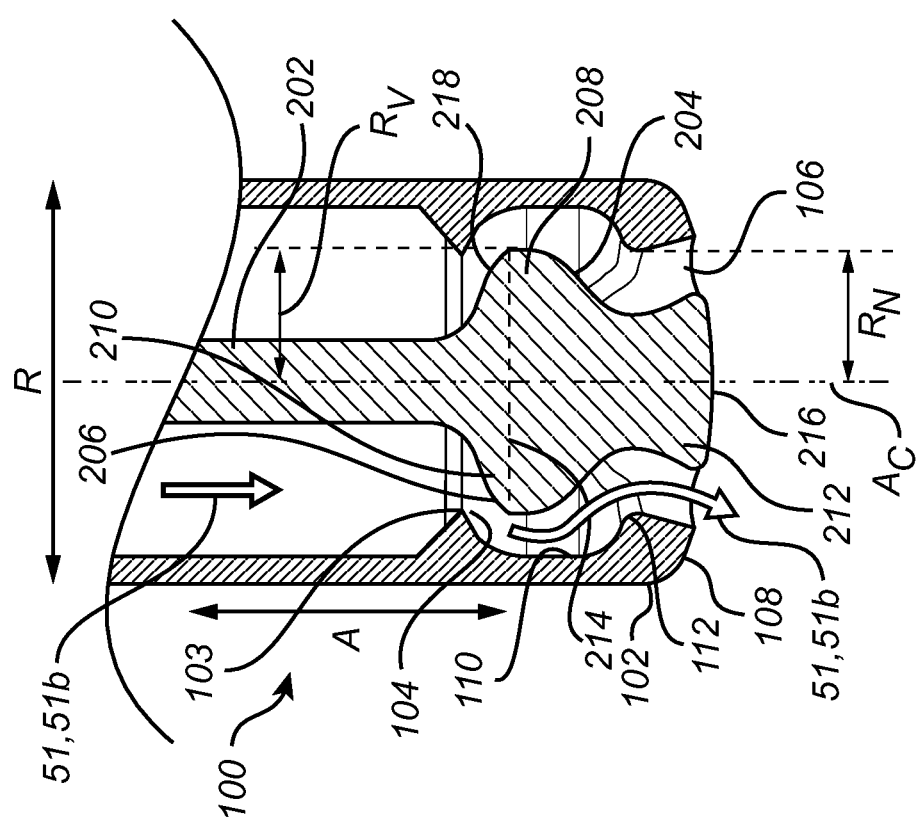
Fig. 3B
Fig. 3A

FUEL INJECTION ARRANGEMENT AND A HYDROGEN INTERNAL COMBUSTION ENGINE

CROSS-REFERENCE TO RELATED APPLICATIONS

This application is a U.S. National Stage application of International Application No. PCT/EP2021/086568, filed Dec. 17, 2021 and published on Jun. 22, 2023 as WO/2023/110133, all of which is hereby incorporated by reference in its entirety.

TECHNICAL FIELD

The present invention relates to a fuel injection arrangement for admitting a flow of hydrogen into a combustion chamber of a hydrogen internal combustion engine. The invention also relates to a hydrogen internal combustion engine comprising such a fuel injection arrangement. Although the invention will mainly be directed to a vehicle in the form of a truck, the invention may also be applicable for other types of vehicles using hydrogen internal combustion engine for generating propulsion power, such as e.g., buses, working machines, and other transportation vehicles.

BACKGROUND

A hydrogen injector for a hydrogen engine is typically run at critical conditions at which the hydrogen flow becomes sonic or even locally supersonic. One problem with this type of flow is difficulties to maintain the initial direction of the jet out of the injector nozzle.

One commonly used hydrogen nozzle is a so called pintle-valve nozzle. An angle of the upper part of the pintle valve surface is a design-parameter which may determine the outgoing direction of the jet. In order to further control the outgoing direction of the jet, a pintle-valve can be combined with a nozzle cap. The cap comprises one or several holes and the configuration of the holes is often used to determine the direction of the outgoing jet.

A particular problem with a hydrogen nozzle is that the nozzle cap hole exit area needs to be larger than conventional engine nozzles. This means that a major part of the nozzle cap side and bottom sides are open holes. It is therefore difficult to design the holes to direct the jets in a wanted direction and at a wanted velocity of the hydrogen, especially at sonic or even locally supersonic hydrogen flow. Further, this may lead to disturbing vortices in the cap volume. Such disturbing vortices may re-direct part of the flow in an un-favourable direction. Furthermore, the cap-volume as such may contain residual hydrogen-containing gases that may auto-ignite at an un-favourable timing.

Accordingly, there is room for improvements with regards to hydrogen flow guidance in hydrogen nozzles.

SUMMARY

It is thus an object of the present invention to at least partially overcome the above described deficiencies.

According to a first aspect, there is provided a fuel injection arrangement for admitting a flow of hydrogen into a combustion chamber of a hydrogen internal combustion engine, the fuel injection arrangement comprising a nozzle cap comprising an inlet arranged at a valve seat and configured to receive a flow of hydrogen, and at least one outlet at a lower portion of the nozzle cap through which the flow of hydrogen is configured to be supplied into the combustion chamber, an inlet valve arrangement at least partly housed by the nozzle cap, the inlet valve arrangement being movable between a closed position at which a portion of the inlet valve arrangement is arranged in abutment with the valve seat to prevent hydrogen from entering the inlet, and an open position at which the flow of hydrogen is allowed to flow between the inlet and the outlet, wherein the inlet valve arrangement comprises an axially extending flow guiding portion comprising an envelope surface facing an inner surface of the nozzle cap, the envelope surface comprising a valve protrusion protruding radially towards the inner surface of the nozzle cap, wherein the inner surface of the nozzle cap comprises a nozzle protrusion protruding radially towards the envelope surface of the flow guiding portion, the nozzle protrusion being arranged axially between the valve protrusion and the at least one outlet of the nozzle cap, wherein the valve protrusion and the nozzle protrusion at least partly overlap in a radial direction.

The wording "portion of the inlet valve arrangement is arranged in abutment with the valve seat" should be construed in such a way that the portion of the inlet valve arrangement is in mechanical contact with the valve seat such that hydrogen is prevented to enter the combustion chamber.

Further, the above reference to "axial" and "radial" directions should be seen as the direction relative to the flow direction of the hydrogen entering the combustion chamber at the valve seat. Hence, the flow of hydrogen is initially, at the valve seat, directed into the combustion chamber in the axial direction. To put it differently, the axial direction corresponds to the direction of motion of a reciprocating inlet valve arrangement of the fuel injector arrangement.

The present invention is based on the insight that by providing a valve protrusion on the inlet valve arrangement and a nozzle protrusion on the nozzle cap as defined above, the flow of hydrogen is obliged to follow the flow guiding portion of the inlet valve arrangement in a more satisfactory manner. In further detail, since the valve protrusion and the nozzle protrusion overlap in the radial direction, the flow of hydrogen is prevented from flowing in a pure axial direction from the valve seat and into the combustion chamber. An advantage is that an improved control of the hydrogen flow is provided as any direct vertical passage of the hydrogen flow is blocked. Moreover, radially overlapping the valve protrusion and the nozzle protrusion can advantageously be combined with a smaller nozzle outlet area, whereby the injection pressure of the hydrogen can be increased. To put it different, a smaller size of the outlet of the nozzle cap enables to design the flow geometry according to the above description. According to a non-limiting example, reducing the size of the outlet by 50% can increase the pressure level of the flow of hydrogen by 100%. Hence, half the size may double the pressure. According to a non-limiting example, the fuel injection arrangement can hence suitably be used for an increased hydrogen flow pressure. The fuel injection arrangement can hence be used in so-called medium pressure hydrogen implementations.

Furthermore, by improving the control of hydrogen flow, it gives the advantageous benefit of optimizing other components of the hydrogen internal combustion engine, such as e.g. the shape of a piston bowl for a piston reciprocating in the hydrogen internal combustion engine. The shape of such piston bowl is highly dependent on the direction of the hydrogen exiting the at least one outlet of the nozzle cap.

According to an example embodiment, the valve protrusion may extend circumferentially around the envelope surface. Preferably, the valve protrusion extends circumferentially around the entire envelope surface. Hereby, it is even further secured that a direct vertical passage of hydrogen is blocked.

According to an example embodiment, the nozzle protrusion may extend in a circumferential direction between a first and a second circumferential end portion of the at least one outlet. The nozzle cap can hereby be provided with two or more outlets whereby, and as will be described in further detail below, the first and second end portions define end portions of the respective outlets. In the case where the nozzle cap comprises a single outlet, the first and second circumferential end portions coincide, i.e. are one and the same position.

According to an example embodiment, the valve protrusion and the nozzle protrusion may be arranged at an axial distance from each other when the inlet valve arrangement assumes the open position. Hereby, it is assured that the valve protrusion and the nozzle protrusion will not interfere with each other and block the flow of hydrogen when the inlet valve arrangement is open. Also, and according to an example embodiment, the valve protrusion may be arranged at an axial distance from the inlet of the nozzle cap when the inlet valve arrangement assumes the closed position.

According to an example embodiment, the inlet valve arrangement may comprise a valve portion and an axially extending head portion having an upper end arranged at the valve portion, and a lower end facing away from the valve portion, wherein the valve portion comprises a surface arranged in abutment with the valve seat when the inlet valve arrangement assumes the closed position.

The head portion can thus advantageously be provided as an add-on portion to a conventional valve portion. An advantage is that the manufacturing of the inlet valve arrangement is simplified. However, and according to an example embodiment, the valve portion and the head portion may be integrally formed with each other.

According to an example embodiment, the axially extending flow guiding portion may form part of the head portion.

According to an example embodiment, the head portion may comprise a taper shaped surface between the valve protrusion and the lower end.

An advantage is that the direction of the hydrogen entering the combustion chamber can be controlled as desired.

According to an example embodiment, a diameter of the head portion may increase along the taper shaped surface in a direction from the valve protrusion to the lower end. In this configuration of the head portion, the flow of hydrogen is radially diverging when entering the combustion chamber, i.e. the flow of hydrogen is directed radially outwards in the combustion chamber. An advantage is that the flow of hydrogen from the fuel injection arrangement into the combustion chamber can hereby maintain its initial direction and reducing the risk of hydrogen fuel jets collapsing. It is also easier to match the shape of the piston bowl to a well-defined flow pattern. With a more uniform flow, the hydrogen fuel is able to reach further away from the nozzle outlet which is beneficial for the mixing process of hydrogen and air.

According to an example embodiment, a diameter of the head portion may decrease along the taper shaped surface in a direction from the valve protrusion to the lower end. In this configuration, the flow of hydrogen is on the other hand radially converging when entering the combustion chamber, i.e. the flow of hydrogen is directed radially inwards in the combustion chamber. The converging flow of hydrogen for a piston bowl shape adapted for receiving the flow of hydrogen at a radially centre. In a similar vein as the diverging flow described above, the converging flow promotes a distinct flow direction, here uniformly arranged, reducing the risk of hydrogen fuel jets collapsing.

According to an example embodiment, the at least one outlet may comprise two outlet portions. An advantage is that the flow entering the combustion chamber can be split into two separate flows, whereby the control of the hydrogen flow into the combustion chamber is improved. It should however be readily understood that the at least one outlet may comprise a plurality of outlet portions, such as three or more outlet portions.

According to an example embodiment, the nozzle cap may comprise a pair of bulge portions at the lower portion of the nozzle cap, each of the bulge portions protrudes radially towards an axially extending geometric centre axis of the fuel injection arrangement to form the two outlet portions. The bulge portions may thus advantageously form the above described first and second circumferential end portions for the extension of the nozzle protrusion. Put it differently, the nozzle protrusion extends circumferentially between the pair of bulge portions.

According to an example embodiment, a portion of the valve arrangement may be arranged in close proximity with the pair of bulge portions when the valve arrangement assumes the open position. By providing the valve arrangement in close proximity with the pair of bulge portions, the flow of hydrogen is directed to the outlet portions formed between the bulge portions.

According to an example embodiment, each of the bulge portions may extend axially from the lower portion of the nozzle cap and in a direction towards the inlet. Preferably, the bulge portions also extend radially towards the inner surface of the nozzle cap during the axial extension from the lower portion of the nozzle cap. Thus, the bulge portions are preferably arranged in a taper-shaped configuration.

According to a second aspect, there is provided a hydrogen internal combustion engine comprising a fuel injection arrangement according to any one of the embodiments described above in relation to the first aspect.

According to a third aspect, there is provided a vehicle comprising a fuel injection arrangement according to any one of the embodiments described above in relation to the first aspect, or a hydrogen internal combustion engine according to the second aspect.

Effects and features of the second and third aspects are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein:

FIG. 3A is a cross-sectional view illustrating an example embodiment of a fuel injection arrangement for the hydrogen internal combustion engine in FIG. 2, FIG. 3B is a perspective view, partly in cut-out, of the exemplified fuel injection arrangement in FIG. 3A.

DETAILED DESCRIPTION

Figure 1:
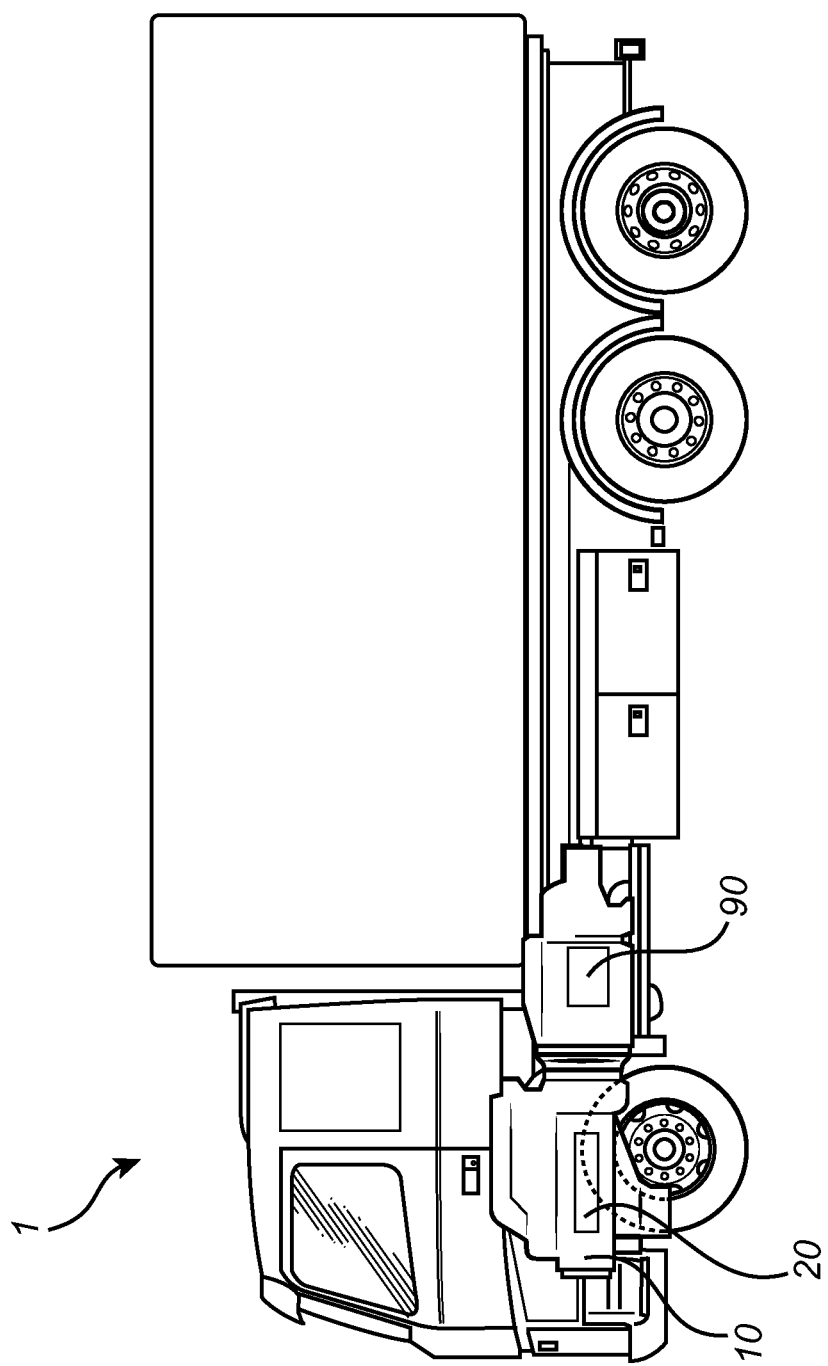
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 in the form of a truck. The vehicle 1 comprises an internal combustion engine, ICE, system 10 for powering and driving the vehicle 1. The ICE system 10 in FIG. 1 comprises an ICE 20. In this example, the ICE system 10 is a hydrogen ICE system, or also referred to as a hydrogen piston ICE system. The combustion in such hydrogen ICE system is based on a combustion of air and hydrogen. The hydrogen, or hydrogen fuel, can be combusted in an internal combustion engine over a wide range of fuel-air mixtures. A hydrogen ICE system may be operated to produce very low emissions during certain conditions. The hydrogen ICE system may operate based on hydrogen liquid or hydrogen gas.

The truck 1 may be a hybrid electric vehicle. By way of example, the hybrid electric vehicle comprises an electric propulsion system having at least one high-voltage battery and at least one electric machine, as well as the hydrogen ICE system 10. The hydrogen ICE 20 of the truck 1 further comprises a fuel injection arrangement with a nozzle cap as disclosed herein, e.g. in FIGS. 2-3B, and further in FIGS. 4A-4B and 5. By way of example, the fuel injection arrangement is a fuel gas injection arrangement configured to directly inject hydrogen gas fuel into a combustion chamber 15 of the ICE 20, as may be gleaned from FIG. 2.

As depicted in FIG. 1, the ICE system 10 further comprises a control unit 90. The control unit 90 is arranged in communication with the components of the ICE system 10, in particular the fuel injection arrangement 100. The control unit 90 is hence configured to control the fuel injector arrangement 100. The control unit 90 may also communicate or be an integral part of a main electronic control unit for controlling the vehicle and various parts of the vehicle.

Figure 2:
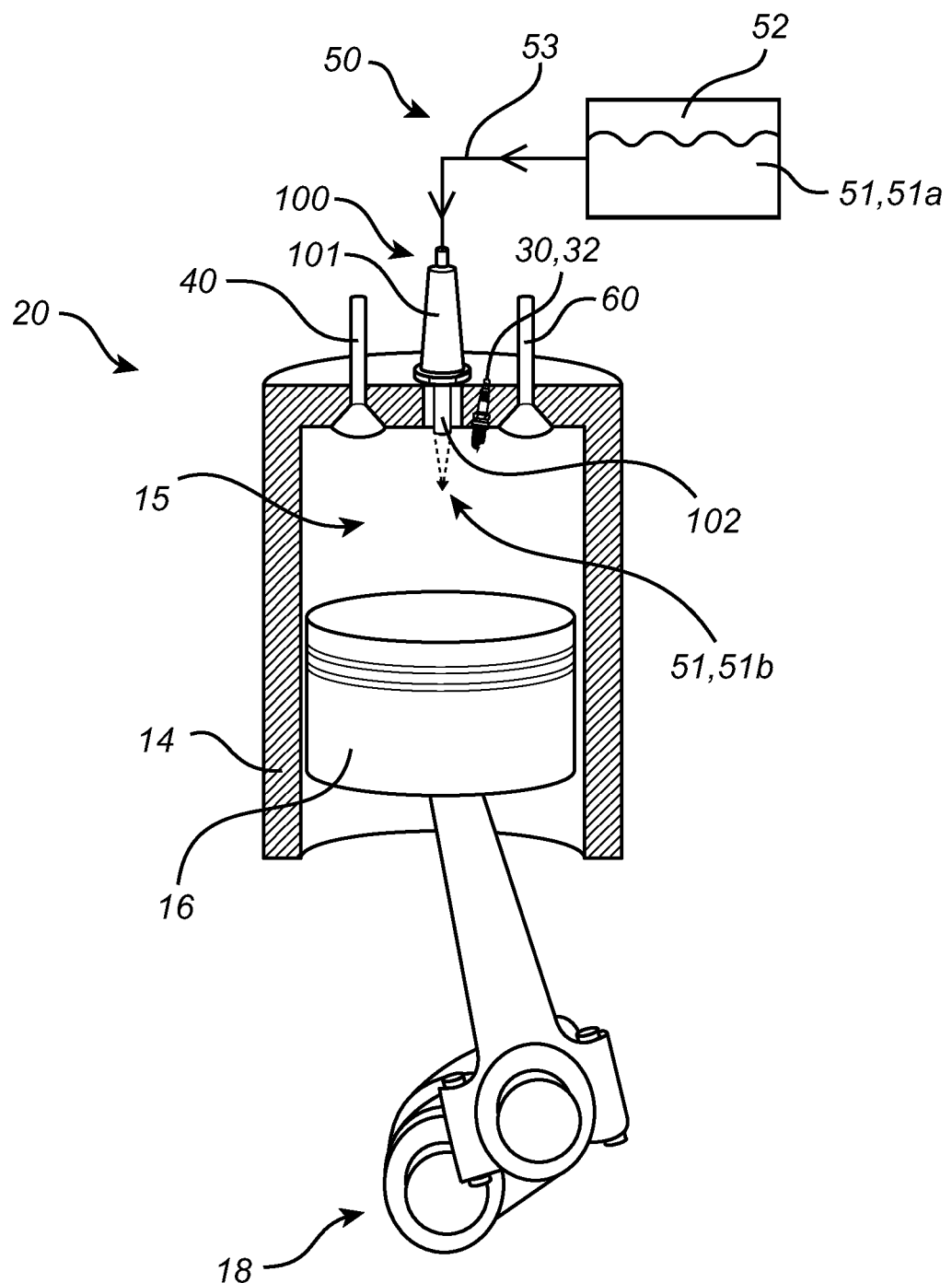
FIG. 2 is a schematic illustration of a hydrogen internal combustion engine according to an example embodiment.

Turning now to FIG. 2, which is a schematic illustration of a hydrogen internal combustion engine 20 according to an example embodiment. The fuel injection arrangement 100 is a fuel gas nozzle injection arrangement having a nozzle cap and an inlet valve arrangement, as will be further described in relation to FIGS. 3A-5. The fuel injection arrangement 100 here also comprises an injector body 101.

FIG. 2 only depicts a single cylinder 14 having a combustion chamber 15 and a reciprocating piston 16 arranged therein. The piston 16 preferably comprising a piston bowl (not shown) facing the injector. In such a case, the flow of hydrogen is directed towards the piston bowl. Although FIG. 2 depicts a single cylinder, the ICE 20 generally comprises a plurality of cylinders 14 operated to combust fuel 51, such as hydrogen gas, whereby the motion of pistons 16 reciprocating in the cylinders 14 is transmitted to a rotation movement of a crank shaft 18. The crank shaft 18 is further coupled to a transmission (not shown) for providing a torque to driving elements (not shown). In case of a heavy-duty vehicle, such as a truck, the driving elements are wheels; however, the ICE 20 may also be used for other equipment such as construction equipment, marine applications, etc.

Generally, each cylinder 14 is provided with a corresponding piston 16 connected to the crankshaft 18 of the ICE 20. The ICE system 10 further comprises an intake manifold (not shown) forming intake guides arranged to guide air to the cylinders 14, and an exhaust guide (not shown) arranged to guide gases from the cylinders 14.

Each cylinder 14 may further comprise at its vertical top end at least one, typically a multiple number of inlet channels having at least one inlet valve 40 for controlling a flow of the inlet air to the combustion chamber 15, and at least one, typically a multiple number of exhaust channels having a least one exhaust valve 60 for controlling discharge of exhaust gases produced from the fuel combustion process taking place within the cylinder 14.

Each one of the cylinders 14 defines at least partly a combustion chamber 15. As is also common, one end of the cylinder cavity is closed by a cylinder head. The piston 16 reciprocates in the cylinder and is connected to the crankshaft 18 so that the piston is set to reverse in the cylinder at an upper dead centre position and at a lower dead centre position.

The ICE system 10 here further comprises a fuel system 50. As illustrated in FIG. 2, the fuel system 50 defines a common fuel line 53 and is configured to supply hydrogen gas to one or more cylinder(s) 16 by means of one or more fuel injection arrangement(s) 100. Optionally, the fuel system 50 may include the plurality of fuel injection arrangements 100. Alternatively, the fuel injection arrangements 100 may be separate parts arranged in fluid communication with the fuel system 50. The number of fuel injection arrangements 100 may be equal to the numbers of cylinders of the ICE 20. The fuel injection arrangements 100 are arranged in fluid communication with the fuel line 53 of the fuel system 50.

The fuel system 50 here also comprises a fuel tank 52 containing the hydrogen fuel 51 in gaseous form 51a. The fuel 51 may also be partly arranged in liquid form in the fuel tank 52. The fuel 51 in the form of gaseous hydrogen 51a is supplied to the fuel injection arrangement 100 of the ICE 20 from the fuel tank 52 via the fuel circuit 53 of the fuel system 50. The fuel circuit 53 is arranged and configured to contain and transport the fuel, as illustrated by the arrows in FIG. 2, and may optionally include one or more additional fuel system components such as a fuel pump, fuel filter etc. These components are of conventional types and thus not further described or illustrated for simplifying the disclosure for the reader.

In addition, the ICE 20 comprises an ignition source 30. The ignition source 30 is arranged in the cylinder and at a location facing the combustion chamber 15, as illustrated in FIG. 2. By way of example, the ignition source 30 is arranged at an upper end of the combustion cylinder and spaced apart from the fuel injector 100. Other arrangements of the ignition source and the fuel injector are also conceivable. For example, the fuel injector 100 can be arranged on one side, radially spaced apart from the axial centre, and the ignition source on the other side of the axial centre.

The ignition source 30 is configured to ignite hydrogen gas jets 51b supplied via the fuel injection arrangement 100. By way of example, the ignition source 30 is a spark-plug 32. A spark plug is a device for delivering electric current from an ignition system to the combustion chamber of a spark-ignition engine to ignite the compressed fuel/air mixture by an electric spark. Typically, in each cylinder 14, there is a corresponding spark plug arranged to ignite a mix of fuel and oxygen in the given cylinder. The hydrogen fuel is generally compressed to a certain level with air. The compressed air-fuel mixture is thus ignited by the spark plug.

In order to describe the fuel injection arrangement 100 in further detail, reference is now made to FIGS. 3A and 3B, which illustrate the fuel injection arrangement 100 according to an example embodiment.

As illustrated in e.g. FIGS. 3A, the fuel injection arrangement 100 extends in an axial direction A and in a radial direction R. Further, the fuel injection arrangement 100 has a circumferential extension along a circumferential direction C, see FIG. 3B. The fuel injection arrangement 100 also has a longitudinal centre axis Ac, which hereinafter is generally denoted as the axial centre axis. The axial centre axis of the fuel injection arrangement 100 is typically, although strictly not necessary, co-axially arranged with an axial centre axis of the piston illustrated in FIG. 2. However, in some examples, the axial centre axis of the fuel injection arrangement 100 may be slightly offset the axial centre axis of the piston.

As mentioned above, the fuel injection arrangement 100 here comprises the injector body 101, see FIG. 2. In addition, the fuel injection arrangement 100 comprises the nozzle cap 102 and an inlet valve arrangement 202, as illustrated e.g. in FIGS. 3A-3B. Hence, the nozzle cap is here defined as the outer part of the fuel injection arrangement 100, i.e. the radial outer part. In addition, the nozzle cap 102 is here defined as the downstream part of the fuel injection arrangement 100. The nozzle cap 102 is preferably attached to the injector body 101. Hence, the nozzle cap 102 and the injector body 101 are preferably arranged as integral parts of the fuel injection arrangement 100.

As can be seen in FIG. 3A, the nozzle cap 102 comprises an inlet 104 which is configured to receive the flow of hydrogen 51, and an outlet 106 through which the flow of hydrogen 51, i.e. the hydrogen gas jets 51b are supplied into the combustion chamber 15. The inlet 104 of the nozzle cap 102 is arranged at a valve seat 103, while the outlet 106 is arranged at a lower portion 108 of the nozzle cap 102, i.e. on an axially opposite side of the nozzle cap 102 compared to the inlet 104.

The inlet valve arrangement 202 is at least partly housed by the nozzle cap 102 and is movable in the axial direction A relative to the nozzle cap 102. In particular, the inlet valve arrangement 202 is movable between a closed position and an open position. In the closed position, a surface 218 of the inlet valve arrangement is arranged in abutment with the valve seat 103. In particular, the inlet valve arrangement 202 comprises a valve portion 210 and an axially extending head portion 212. The valve portion 210 and the head portion 212 are connected to each other, either as separate parts or integrally formed at an upper end 214 of the head portion. The surface 218 of the inlet valve arrangement 202 is thus arranged on the valve portion 210. The head portion 216 comprises a lower end 216 on an axially opposite end compared to the upper end 214. Hereby, hydrogen 51 is prevented from entering the inlet 104. Put it differently, when the inlet valve arrangement 202 assumes the closed position, the portion 105 of the inlet valve arrangement 202 is forming a closed lid to the valve seat 103. When the inlet valve arrangement 202 assumes the open position, the inlet valve arrangement 202 is moved axially towards the combustion chamber 15 such that the flow of hydrogen 51 is allowed to flow between the inlet 104 and the outlet 106.

As is also depicted in e.g. FIG. 3A, the inlet valve arrangement 202 comprises an axially extending flow guiding portion 204. The axially extending flow guiding portion 204 forms part of the above described head portion 212. Thus, the flow of hydrogen 51 is flowing along the flow guiding portion 204 between the inlet 104 and the outlet 106. The flow guiding portion 204 comprises an envelope surface 206 facing an inner surface 110 of the nozzle cap 102. Further, the envelope surface 206 comprises a valve protrusion 208. The valve protrusion 208 is arranged between the inlet 104 and the outlet 106 of the nozzle cap 102 and protrudes radially towards the inner surface 110 of the nozzle cap 102. As can be gleaned from FIG. 3B, the valve protrusion extends circumferentially around the envelope surface 206.

Moreover, the nozzle cap 102 comprises a nozzle protrusion 112. In particular, the nozzle protrusion 112 is arranged on the inner surface 110 of the nozzle cap 102 and protrudes radially towards the envelope surface 206 of the flow guiding portion 204. In the exemplified embodiment depicted in FIGS. 3A and 3B, the nozzle protrusion 112 extends in a circumferential direction a full lap around the inner surface 110. To put it differently, the nozzle protrusion 112 extends from a first circumferential end portion of the outlet 106 to a second circumferential end portion of the outlet 106. Since the exemplified embodiment in FIGS. 3A-3B comprises a single outlet 106, the first and second circumferential end portions coincide, i.e. they are one and the same position. In further detail, the nozzle protrusion 112 is arranged axially between the valve protrusion 208 and the outlet 106 of the nozzle cap 102. Further, the nozzle protrusion 112 and the valve protrusion 208 at least partly overlap in the radial direction R. In yet further detail, the valve protrusion 208 protrudes a radial distance $R_V$ from the axial centre axis Ac. The nozzle protrusion 112 on the other hand protrudes towards the envelope surface 206 of the flow guiding portion 204 where a radial distance from the axial centre axis Ac to a radial tip of the nozzle protrusion 112 is denoted as $R_N$. The nozzle protrusion 112 and the valve protrusion 208 at least partly overlap in the radial direction R by the radial distance $R_V$ of the valve protrusion 208 being larger than the radial distance $R_N$ of the nozzle protrusion 112.

By the radial overlap, the flow of hydrogen 51, 51b is obliged to follow the flow guiding portion of the inlet valve arrangement 202, and hence prevented from flowing in a pure axial direction from the valve seat and into the combustion chamber 15. The valve protrusion 208 is thus arranged at an axial distance from the inlet 104 of the nozzle cap 102 when the inlet valve arrangement 202 assumes the closed position.

As if also depicted in FIGS. 3A-3B, the head portion 212 is arranged in a tapered shape. In detail, the head portion 212 comprises a taper shaped surface 230 axially between the valve protrusion 208 and the lower end 216. The taper shaped surface 230 of the exemplified embodiment in FIGS. 3A-3B is formed in such a way that a diameter of the head portion 212 increases along the taper shaped surface 230 in a direction from the valve protrusion 208 towards the lower end 216. To put it differently, the radial distance from the axial centre axis Ac increases along the taper shaped surface 230 from the valve protrusion 208 towards the lower end 216. Hereby, the hydrogen jets exhausted through the outlet 106 will diverge, i.e. the hydrogen jets will flow into the combustion chamber 15 in an axial direction as well as in a radial direction away from the axial centre axis Ac.

Figure 4B:
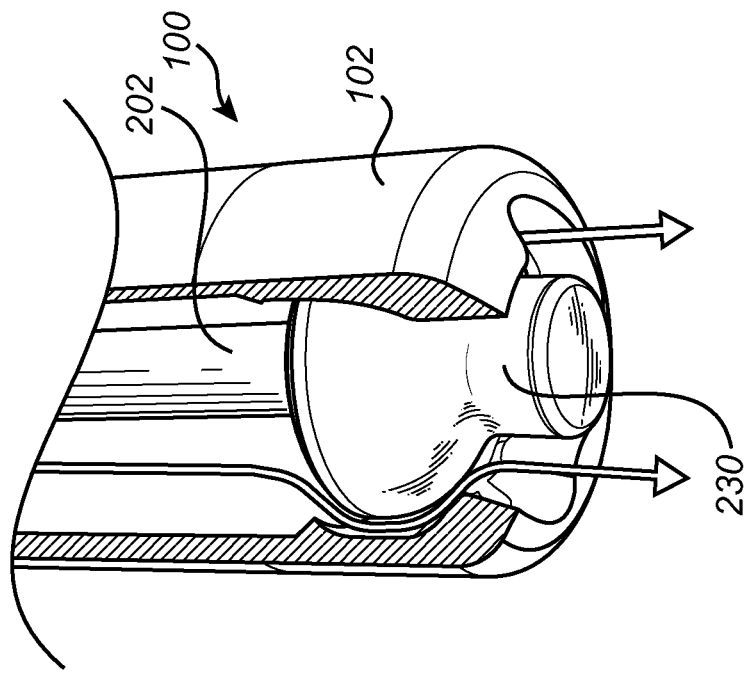
FIG. 4B is a perspective view, partly in cut-out, of the exemplified fuel injection arrangement in FIG. 4A.
Figure 4A:
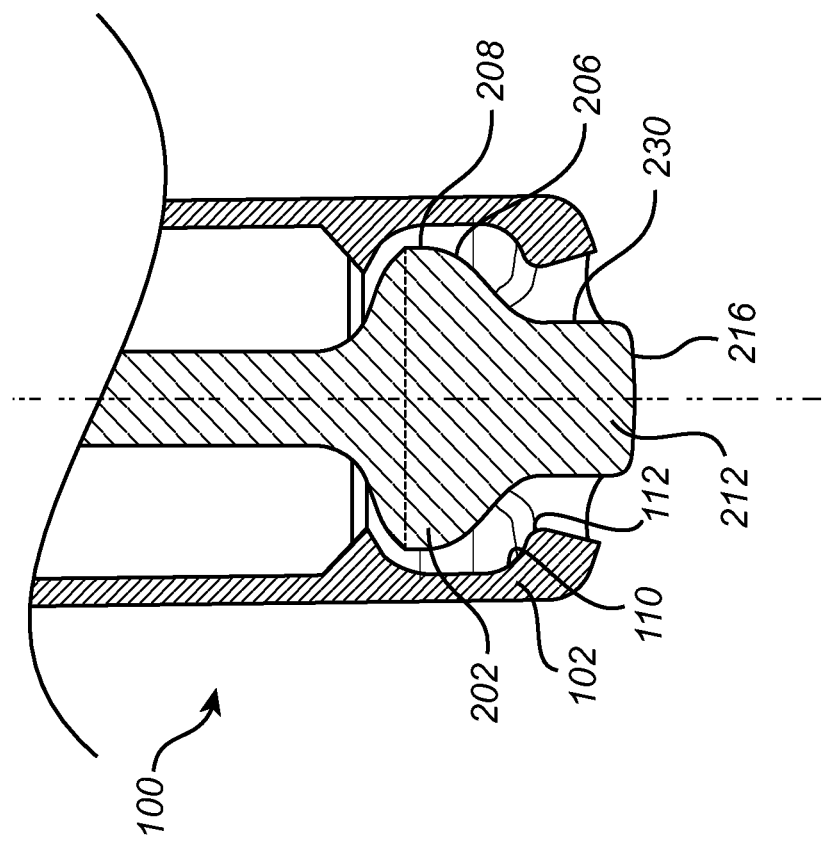
FIG. 4A is a cross-sectional view illustrating another example embodiment of a fuel injection arrangement for the hydrogen internal combustion engine in FIG. 2.

Reference is now made to FIGS. 4A-4B which the fuel injection arrangement 100 according to another example embodiment.

In order to describe the fuel injection arrangement 100 in further detail, reference is now made to FIGS. 3A and 3B, which illustrate the fuel injection arrangement 100 according to an example embodiment. The fuel injection arrangement 100 in FIGS. 4A and 4B comprises a plurality of similar features as the fuel injection arrangement 100 described above in relation to FIGS. 3A-3B. As such, following description in relation to FIGS. 4A and 4B will mainly focus the differences compared to the embodiment of FIGS. 3A and 3B.

The fuel injection arrangement 100 in FIGS. 4A-4B also comprises the above described inlet valve arrangement 202 and nozzle cap 102. In a similar vein as described above, the inlet valve arrangement 202 comprises the valve protrusion 208 arranged on the envelope surface 206, and the nozzle cap 102 comprises the nozzle protrusion 112 on the inner surface 110.

As can be seen in FIGS. 4A-4B, the head portion 212 is here also arranged in a tapered shape. In detail, the head portion 212 depicted in FIGS. 4A and 4B also comprises a taper shaped surface 230 axially between the valve protrusion 208 and the lower end 216. The difference between the taper shaped surface 230 of FIGS. 4A-4B and the taper shaped surface of FIGS. 3A-3B is that the taper shaped surface 230 of the exemplified embodiment in FIGS. 4A-4B is formed in such a way that a diameter of the head portion 212 decreases along the taper shaped surface 230 in a direction from the valve protrusion 208 towards the lower end 216. To put it differently, the radial distance from the axial centre axis Ac decreases along the taper shaped surface 230 from the valve protrusion 208 towards the lower end 216. Hereby, the hydrogen jets exhausted through the outlet 106 will instead converge, i.e. the hydrogen jets will flow into the combustion chamber 15 in an axial direction as well as in a radial direction towards the axial centre axis Ac.

Figure 5:
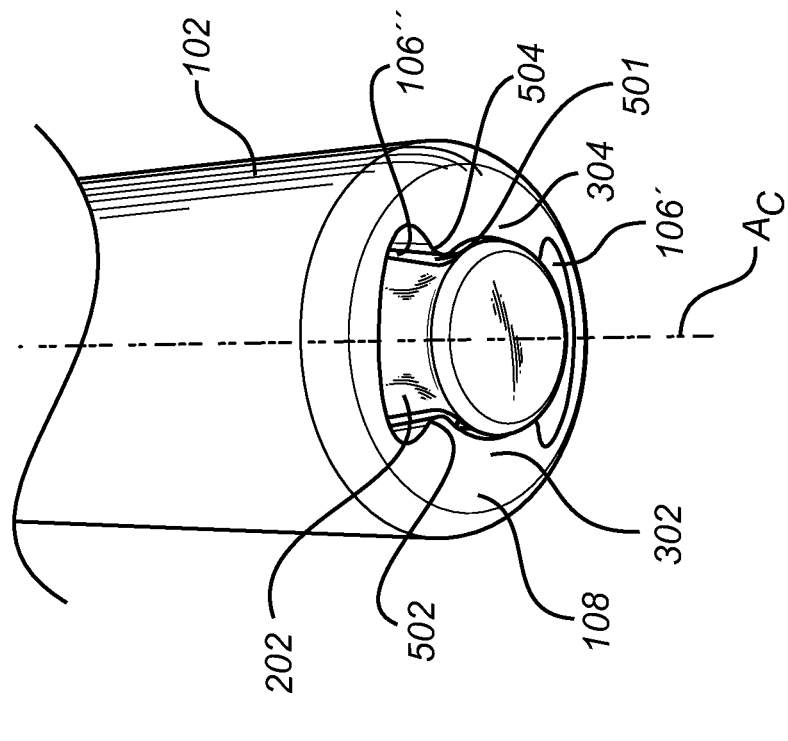
FIG. 5 illustrates an example embodiment of a nozzle cap.
Figure 5:
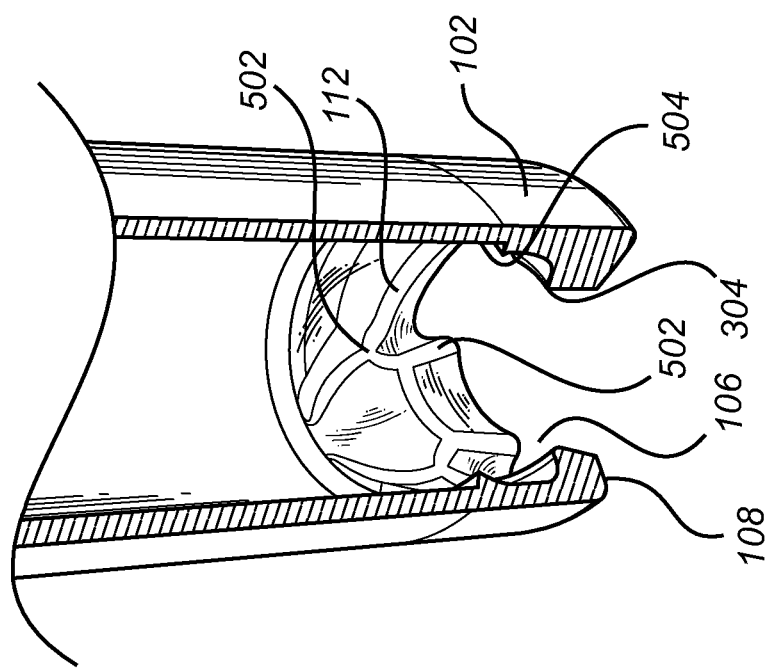

Reference is finally made to FIG. 5 which is a perspective view of the nozzle cap according to another example embodiment. The portion of FIG. 5 on the right hand side illustrates the inlet valve arrangement 202 for informative purposes. The inlet valve arrangement 202 can be any one of the inlet valve arrangements 202 described above in relation to FIGS. 3A-4B.

A difference between the nozzle cap 102 in FIG. 5 is that the outlet 106 comprises two outlet portions 106', 106". Hence, the outlet 106 comprises a first outlet portion 106' and a second outlet portion 106". The two outlet portions 106', 106" are formed by a pair of bulge portions 302, 304 arranged at the lower portion 108 of the nozzle cap 102. The first 106' and second 106" outlet portions are thus arranged between the pair of bulge portions 302, 304, respectively. Each of the bulge portions 302, 304 protrudes radially towards the axial centre axis Ac.

When the inlet valve arrangement 202 assumes the open position, a portion 501 of the valve arrangement is arranged in close proximity with the pair of bulge portions. Preferably, the portion 501 of the valve arrangement is arranged in such close proximity with the pair of bulge portions 302, 304 that the flow of hydrogen will only pass through the first 106' and second 106" outlets.

As can be seen in the left portion of FIG. 5, the bulge portions 302, 304 extends axially from the lower portion of the nozzle cap and in a direction towards the inlet. The bulge portions 302, 304 are also arranged in a tapered shape, at which the bulge portions 302, 304 is directed radially away from the axial centre axis Ac along the axial extension towards the inlet.

Moreover, in the FIG. 5 embodiment, the nozzle protrusion 112 extends in a circumferential direction between a first 502 and a second 504 circumferential end portion of the respective outlet portions 106', 106". The first 502 and second 504 circumferential end portions are thus defined by the bulge portions, i.e. the nozzle protrusion 112 extends between the bulge portions 302, 304.

It is to be understood that the present disclosure is not limited to the embodiments described above and illustrated in the drawings; rather, the skilled person will recognize that many changes and modifications may be made within the scope of the appended claims.

The invention claimed is:

1. A fuel injection arrangement for admitting a flow of hydrogen into a combustion chamber of a hydrogen internal combustion engine, the fuel injection arrangement comprising:
    a nozzle cap comprising an inlet arranged at a valve seat and configured to receive a flow of hydrogen, and at least one outlet at a lower portion of the nozzle cap through which the flow of hydrogen is configured to be supplied into the combustion chamber,
    an inlet valve arrangement at least partly housed by the nozzle cap, the inlet valve arrangement being movable between a closed position at which a portion of the inlet valve arrangement is arranged in abutment with the valve seat to prevent hydrogen from entering the inlet, and an open position at which the flow of hydrogen is allowed to flow between the inlet and the outlet, the inlet valve arrangement comprising a valve portion and an axially extending head portion having an upper end arranged at the valve portion, and a lower end facing away from the valve portion, wherein the valve portion comprises a surface arranged in abutment with the valve seat when the inlet valve arrangement assumes the closed position, wherein the inlet valve arrangement comprises an axially extending flow guiding portion forming part of the head portion, wherein the flow of hydrogen is configured to flow along the flow guiding portion between the inlet and the outlet, the axially extending flow guiding portion comprising an envelope surface facing a smooth inner surface of the nozzle cap, wherein the smooth inner surface extends from the valve seat to the lower portion of the nozzle cap, the envelope surface comprising a valve protrusion protruding radially towards the smooth inner surface of the nozzle cap,
    wherein the smooth inner surface of the nozzle cap comprises a nozzle protrusion protruding radially towards the envelope surface of the flow guiding portion, the nozzle protrusion being arranged axially between the valve protrusion and the at least one outlet of the nozzle cap, wherein the valve protrusion and the nozzle protrusion at least partly overlap in a radial direction.

2. The fuel injection arrangement according to claim 1, wherein the valve protrusion extends circumferentially around the envelope surface.

3. The fuel injection arrangement according to claim 1, wherein the nozzle protrusion extends in a circumferential direction between a first and a second circumferential end portion of the at least one outlet.

4. The fuel injection arrangement according to claim 1, wherein the valve protrusion and the nozzle protrusion are arranged at an axial distance from each other when the inlet valve arrangement assumes the open position.

5. The fuel injection arrangement according to claim 1, wherein the valve protrusion is arranged at an axial distance from the inlet of the nozzle cap when the inlet valve arrangement assumes the closed position.

6. The fuel injection arrangement according to claim 1, wherein the valve portion and the head portion are integrally formed with each other.

7. The fuel injection arrangement according to claim 1, wherein the axially extending flow guiding portion forms part of the head portion.

8. The fuel injection arrangement according to claim 1, wherein the head portion comprises a taper shaped surface between the valve protrusion and the lower end.

9. The fuel injection arrangement according to claim 8, wherein a diameter of the head portion increases along the taper shaped surface in a direction from the valve protrusion to the lower end.

10. The fuel injection arrangement according to claim 8, wherein a diameter of the head portion decreases along the taper shaped surface in a direction from the valve protrusion to the lower end.

11. The fuel injection arrangement according to claim 1, wherein the at least one outlet comprises two outlet portions.

12. The fuel injection arrangement according to claim 11, wherein the nozzle cap comprises a pair of bulge portions at the lower portion of the nozzle cap, each of the bulge portions protrudes radially towards an axially extending geometric centre axis of the fuel injection arrangement to form the two outlet portions.

13. The fuel injection arrangement according to claim 12, wherein a portion of the valve arrangement is arranged in close proximity with the pair of bulge portions when the valve arrangement assumes the open position.

14. The fuel injection arrangement according to claim 12, wherein each of the bulge portions extends axially from the lower portion of the nozzle cap and in a direction towards the inlet.

15. A hydrogen internal combustion engine comprising a fuel injection arrangement according to claim 1.

16. A vehicle comprising a fuel injection arrangement according to claim 1.

* * * * *